Nov. 23, 1971 G. P. STERNBERG 3,621,796

METHOD AND APPARATUS FOR CONTINUOUS DOUGH MIXER

Filed Aug. 28, 1968 4 Sheets-Sheet 1

INVENTOR
GEORGE P. STERNBERG
BY
Alfred R. Fuchs
ATTORNEY

Nov. 23, 1971  G. P. STERNBERG  3,621,796
METHOD AND APPARATUS FOR CONTINUOUS DOUGH MIXER
Filed Aug. 28, 1968  4 Sheets-Sheet 2
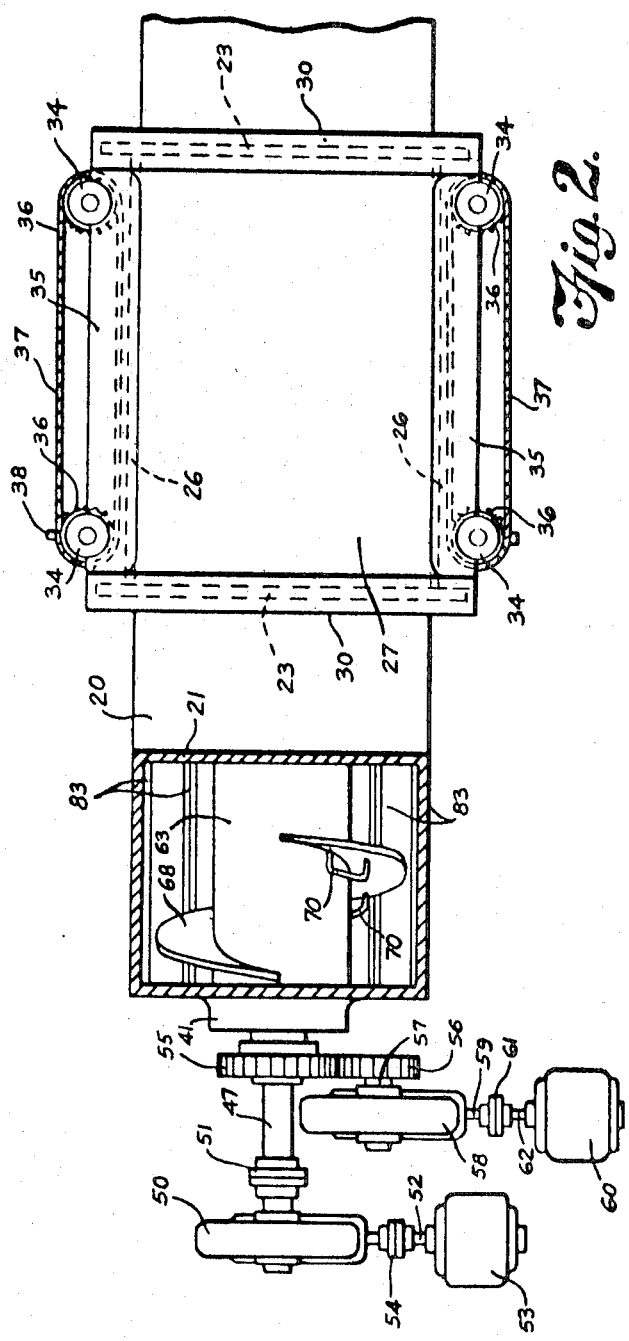
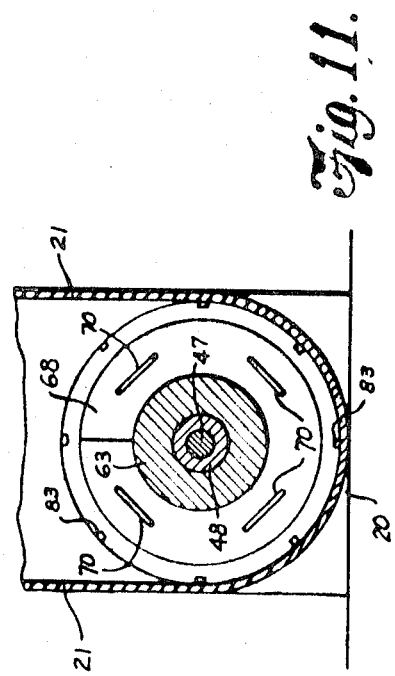
INVENTOR.
GEORGE P. STERNBERG
BY
Alfred R. Fuchs
ATTORNEY

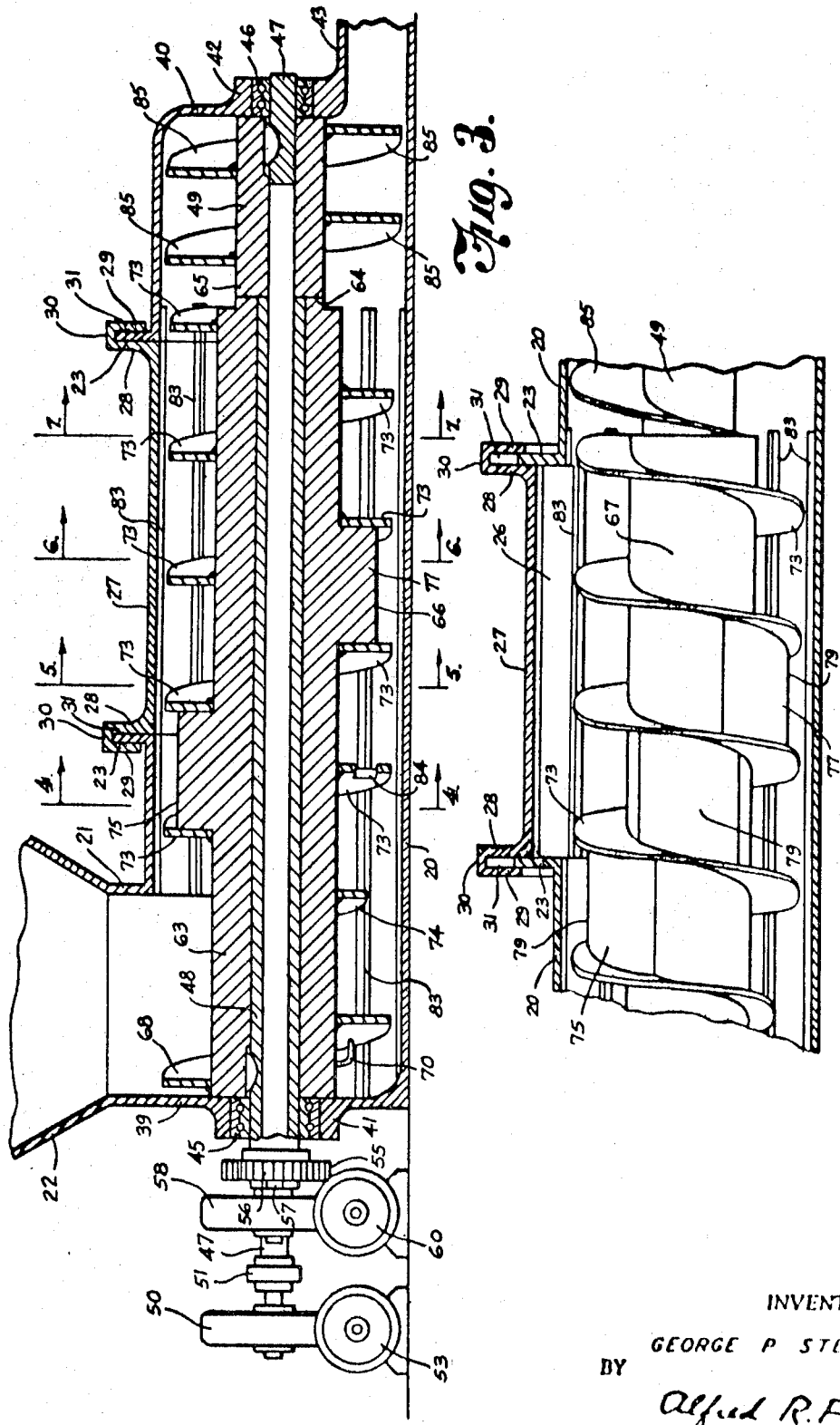

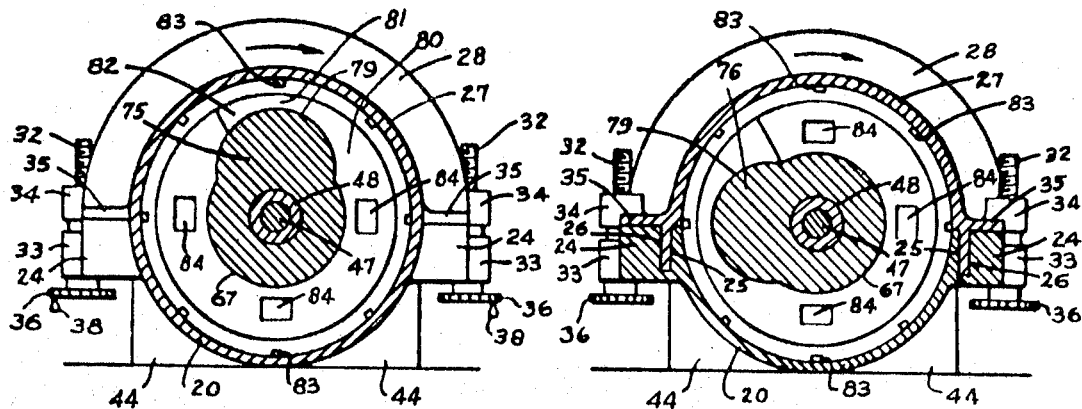
Fig. 4.
Fig. 5.
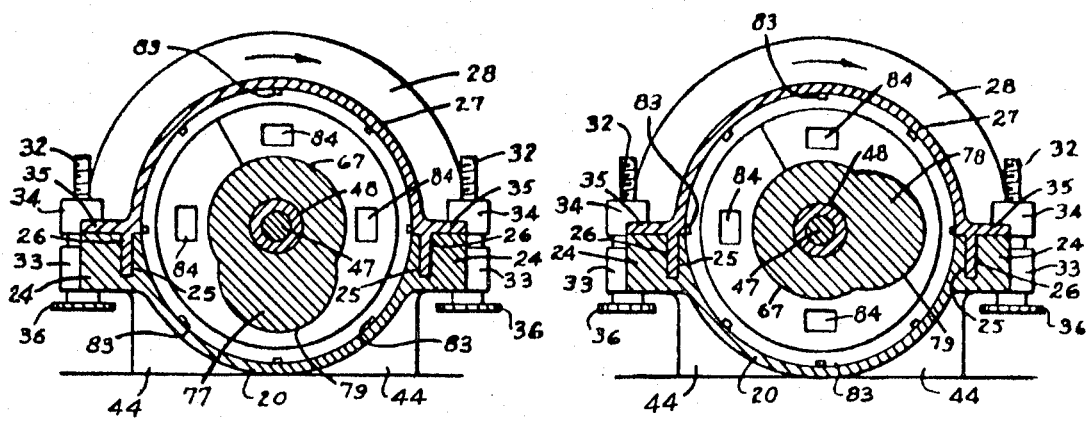
Fig. 6.
Fig. 7.
INVENTOR.
GEORGE P. STERNBERG
BY
Alfred R. Fuchs
ATTORNEY

United States Patent Office 3,621,796
Patented Nov. 23, 1971

3,621,796
METHOD AND APPARATUS FOR CONTINUOUS DOUGH MIXER
George P. Sternberg, 3740 Wyoming St., Kansas City, Mo. 64111
Filed Aug. 28, 1968, Ser. No. 755,966
Int. Cl. A21c 1/00
U.S. Cl. 107—30
18 Claims

ABSTRACT OF THE DISCLOSURE

A continuous dough mixer that has a mixing chamber having a tubular wall to which a hopper feeds the dough ingredients at one end and from which an outlet connection discharging developed dough leads from the other end, and an agitator that has lengthwise adjacent pre-mixing and developing sections extending lengthwise in the chamber. Both sections have a core, the core of the pre-mixing section having a cylindrical surface concentric with the axis of rotation of the agitator and a spiral flange on the core that has a gap in it and spaced projecting agitating bars on the spiral flange, while the developing section has a spiral flange that has regularly spaced openings in it and its core has helically spaced thickened portions between the turns of the flange, providing protuberances extending toward the wall and reduced passage portions between the core and wall. The tubular wall at the developing zone has an arcuate portion movable toward and away from the agitating means to vary the spacing between the agitating means and the wall for adjustment of the developing action. A screw conveyor driven and adjustable in speed independently of the agitating means pulls the developed dough out of the developing chamber. Inwardly directed ribs run lengthwise of the pre-mixing and developing chambers along the tubular wall.

---

A purpose of my invention is to provide a continuous dough mixer which has inlet means at one end of an elongated tubular mixing chamber which preferably has its axis extending substantially horizontally, and an outlet passage at the opposite end thereof, with rotatable means in the tubular chamber that first pre-mixes and then develops the dough as it advances the dough from the inlet connection to the outlet passage.

The rotatable means and the chamber walls are preferably so constructed that the agitating means in the mixing chamber provides a pre-mixing zone for the dough ingredients adjacent the inlet connection from which the pre-mixed dough ingredients are conveyed into a developing zone in which suitable agitating means is provided, which also advances the dough toward the outlet connection and is so constructed that the dough mixture will be forced repeatedly through a plurality of passages reduced in cross section so as to exert a compressing action on the dough mixture alternating with an expanding action as the dough mixture is advanced lengthwise through the developing chamber.

It is also a purpose of my invention to provide means for increasing the developing action in the developing chamber by providing a spiral flange on the agitating means mounted on a core provided on said agitating means, which flange is provided with openings for increasing the pulling action exerted by the flange on the dough mixture, and to provide longitudinally extending inwardly directed ribs on the inner face of the wall of the chamber, also for increasing the pulling action of the agitating means.

More specifically, my continuous dough mixer is provided with agitating means in the developing chamber which advances the dough lengthwise of the developing chamber from the pre-mixing zone toward the outlet connection which has a core provided with thickened portions providing protuberances on the core so as to form a plurality of reduced spaces between the chamber wall and the core at helically spaced points along the agitating member.

It is another purpose of my invention to provide means for adjusting the amount of development of the dough produced by my continuous mixer comprising an arcuate wall portion of the chamber which is movable toward and away from the axis of rotation of the agitating means to thus provide means for varying the pulling action exerted on the dough mixture to develop it by cooperating action of the chamber wall and the agitating means.

SUMMARY

It is the principal purpose of my invention to provide a continuous dough mixer that has a tubular walled mixing chamber, rotatable agitating and conveying means in the chamber mounted between an inlet connection adjacent one end of the chamber and an outlet connection at the other end of the chamber which includes dough developing means that is so constructed and arranged that it will provide helically spaced reduced spaces between the rotatable means and the tubular wall for creating alternating dough compressing and dough expanding zones in the developing chamber which has a wall portion movable toward and away from the rotatable means. Other objects and advantages of my invention will appear as the description of the drawings proceeds.

In the drawings:

FIG. 2 is a plan view thereof.

FIG. 3 is a longitudinal sectional view of my mixer, a portion of the hopper being broken away.

FIG. 4 is a section taken on the line 4—4 of FIG. 3.

FIG. 5 is a section taken on the line 5—5 of FIG. 3.

FIG. 6 is a section taken on the line 6—6 of FIG. 3.

FIG. 7 is a section taken on the line 7—7 of FIG. 3 showing the movable arcuate wall in one position thereof.

FIG. 9 is a fragmentary longitudinal sectional view showing the agitating member in side elevation .

FIG. 11 is a fragmentary section taken on the line 11—11 of FIG. 10.

Figure 1:
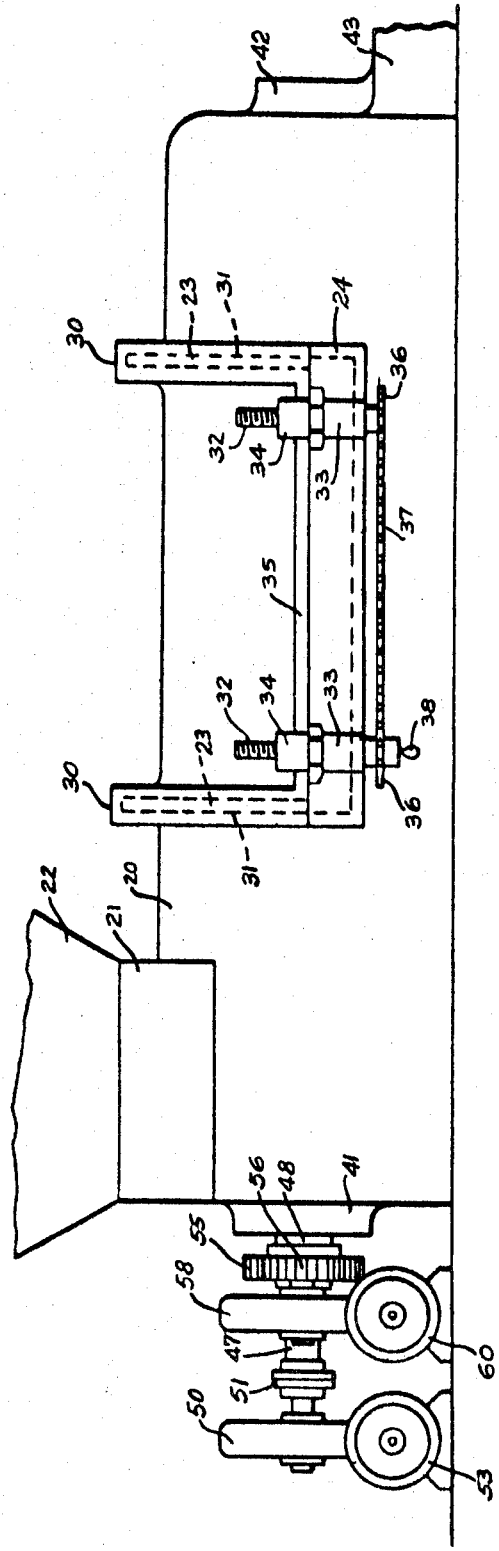
FIG. 1 is a side elevation of my continuous dough mixer, a portion of the hopper being broken away.
Figure 8:
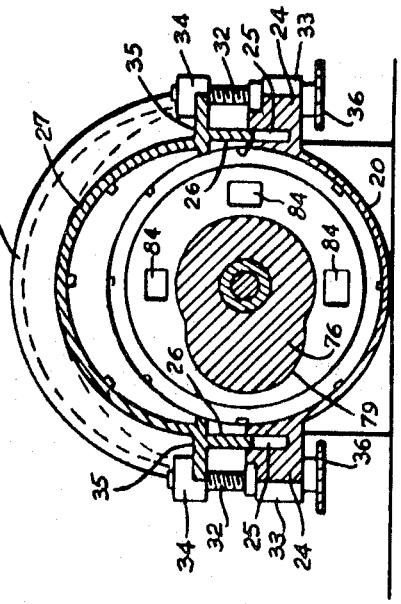
FIG. 8 is a section similar to FIG. 5 but showing the movable arcuate wall in another position thereof.

Referring in detail to the drawings, my improved continuous dough mixer is provided with a tubular wall portion 20 which is substantially cylindrical over the major portion of its length, being provided with an upward extension 21 at one end thereof leading from a hopper 22 and having an opening at a predetermined location between the ends thereof, a pair of upstanding flanges 23 being provided on said tubular body portion at opposite ends of said opening, said wall portion 20 thus forming the main body portion of the machine. The tubular body portion is provided with thickened portions 24 at opposite sides of said opening, which are provided with vertical slots 25 into which depending flanges 26 on a movable wall section 27 extend. Said movable wall section 27 is provided with an arcuate body portion that is curved on substantially the same radius as the tubular body portion 20. Along the opposite marginal longitudinal edges of the movable wall portion 27 are outwardly extending arcuate flanges 28 and inwardly extending arcuate flanges 29 connected by a transverse portion 30 to provide guide slots 31 receiving the flanges 23 for guiding the movements of the movable wall section 27 in cooperation with the depending flanges 26 and slots 25.

Means is provided for moving the arcuate wall portion 27 of the mixing chamber inwardly and outwardly with respect to the main body portion 20 of said mixing chamber, said means being shown as comprising screwthreaded members 32 mounted for rotation in bearing members 33 provided on the thickened portion 24, and held against lengthwise movement of said screwthreaded members 32 with respect to said bearing members 33. Said screwthreaded members 32 have screwthreaded engagement with internally threaded sleeves 34 fixed in position on the outwardly directed lateral flanges 35 on the movable wall portion 27. Each of the screwthreaded members 34 has mounted thereon to rotate therewith a sprocket 36. Sprocket chains 37 extend over the pair of sprockets 36 on each side of the movable wall portion 27 and means is provided for rotating each pair of sprockets and screwthreaded members 32, comprising the cranks 38 fixed on the screwthreaded members 32. When the sprockets 36 are rotated in one direction the screwthreaded members 32 will be rotated in a direction to move the arcuate wall portion 27 upwardly or outwardly with respect to the main body portion 20 of the mixing chamber, and when rotated in the opposite direction the arcuate wall portion will be moved downwardly or inwardly with respect to the main body portion 20 of the mixing chamber.

The main body portion of the mixing chamber is provided with end walls 39 and 40 which are provided with thickened portions 41 and 42, for receiving bearings for rotatable means to be described below, and the end wall 40 is provided with an outlet passage 43 extending from the lower portion thereof. Suitable base members 44 are provided for supporting the tubular wall body portion 20 on any suitable support. Suitable anti-friction bearing means 45 and 46 are provided in the thickened bearing receiving portions 41 and 42.

A shaft 47 is mounted in the bearing 46 and a tubular shaft 48 is mounted in the bearing 45, the tubular shaft 48 rotatably receiving the shaft 47 closely. The ends of the shaft 47 extend beyond the opposite ends of the tubular shaft 48 and the shaft 47 has a sleeve 49 keyed thereto which is mounted between the end of the shaft 48 and the bearing 46. The left hand end of the shaft 47 is connected with a reduction gearing 50 through a suitable coupling 51 and the shaft 52 of the motor 53 is also connected by means of a coupling 54 with the reduction gearing 50. Thus the reduction gearing 50 is interposed between the motor shaft 52 and the shaft 47. Mounted on the end of the tubular shaft 48 is a gear 55 with which a gear 56 meshes, the gear 56 being mounted on the output shaft 57 of a reduction gearing 58, the input shaft 59 of which is driven by the motor 60 through a coupling 61 connecting the output shaft 62 with the input shaft 59 of said reduction gearing. The reduction gearings 50 and 58 are ordinarily adjustable by suitable means to vary the speed of the shafts 47 and 48, as may be found desirable.

Mounted on the hollow shaft 48 to rotate therewith is the core of an agitator member which has the cylindrical portion 63 at one end thereof and a reduced end portion 64 at the other end thereof engaging the shoulder 65 formed between the main body portion of the hollow shaft 48 and the sleeve 49. Between the end portion 65 thereof and the cylindrical end portion 63 thereof the core has a portion 66 which has enlargements thereon extending beyond the periphery 67 curved concentrically to the axis of the shaft 48. The thickened portions will be described more in detail below.

Figure 10:
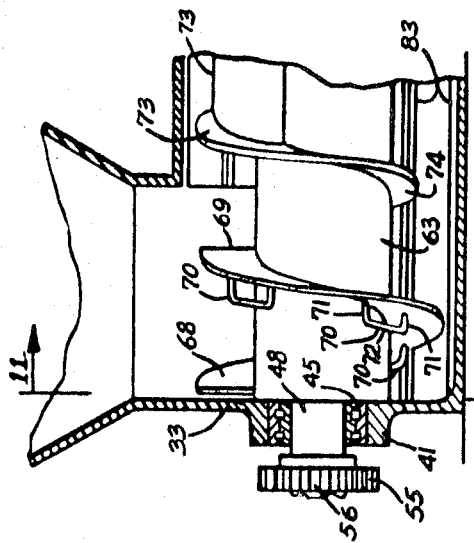
FIG. 10 is a fragmentary vertical sectional view at the inlet end of the mixing chamber, the agitating means being in side elevation.

Mounted on the core portion 63 is a spiral flange 68 which extends through only a portion thereof, terminating at 69, as shown in FIG. 10. Agitating bars 70 projecting therefrom are provided at spaced intervals on the spiral flange 68. The number of said agitating bars may be varied, the number shown being merely illustrative.

Each of said agitating bars has a pair of legs 71 extending outwardly from the spiral flange 68 and a transverse portion 72 connecting the portions 71 thereof. The spiral flange 68 extends with respect to the rotation of the shaft 48 so as to convey the dough ingredients inserted into the mixing chamber through the hopper 22 toward the right, as viewed in FIGS. 3 and 10 of the drawings. The flange 68 terminates short of the right end of the cylindrical core portion 63, in order to retard the passage of the dough ingredients beyond the right end of said cylindrical core portion 63, so that the ingredients of the dough will be thoroughly mixed and the dry ingredients will have absorbed the liquid ingredients. The mixing action is such that a homogenous mixture of the dough ingredients will be produced in the portion of the mixing chamber containing the cylindrical core portion 63. This portion of the mixing chamber and of the agitator therein thus constitutes the pre-mixing portion of the apparatus.

The portion of the core of the agitating means, which is located to the right of the cylindrical core portion 63, is provided with a spiral flange 73 which extends in such a direction that said flange will act as means for conveying the dough mixture toward the right in FIGS. 3 and 9, as the shaft 48 and said agitator member rotate in the direction of the arrow in FIGS. 4 to 8 inclusive. The spiral flange 73 has a portion 74 which extends from the cylindrical core portion 63 and gradually increases in height until it reaches the full heighth of the spiral flange 73.

The enlargements above referred to, provided on the portion 66 of the core of the agitator member, are in the form of thickened portions or protuberances on the core which are located between adjacent turns of the spiral flange 73. Said thickened portions or protuberances are arranged so as to be spaced uniformly around the core helically. The number of such thickened portions or protuberances and the spacing thereof is preferably such that certain ones thereof will be opposite each other with respect to the axis of the shaft so as to prevent any imbalance of the rotating agitator member due to the provisions of the thickened portions theeron. While the number of thickened portions of protuberances may be varied as may be found desirable, four such protuberances are shown in the drawings spaced 90° apart around the axis of the agitator member. The first such protuberance nearest the hopper 22 is indicated by the numeral 75; the next protuberance by the numeral 76; the third one by the numeral 77 and the fourth one by the numeral 78, the protuberance or thickened portion 75, being thus dimetrically opposite the protuberance or thickened portion 77, and the protuberance 76 being thus diametrically opposite the protuberance 78. Each of said protuberance is provided with a convex wall portion 79 which gradually approaches the inner face of the tubular wall 20 of the mixing chamber from the points where said convex surface 79 intersects the convex surface 77 of the main body portion of the core portion 66.

As the agitator member is rotated it will be obvious that each of the thickened portions will in turn cause the space between the inner face of the tubular wall 20 and the core of the agitator member to gradually decrease through the portion 80 of said space until a minimum is reached at 81, and then the space will again increase as indicated at 82, as the rotation of the agitator member, in the direction indicated in FIG. 4, for example, takes place. Thus the dough mixture, as it travels through the portion of the mixer having the core portion 66, will as it encounters the thickened portions 75, 76, 77 and 78, be gradually subjected to increasing pressure followed by gradually decreasing pressure at each of said projections, while when traveling between the portion 67 of the agitator surface and the tubular wall 20 the dough will be free to expand from the compressed condition produced by the reduction in space between the agitator member and the tubular housing by each of the thickened portions or protuberances 75, 76, 77 and 78 in succession. This alternate compression and expansion of the dough mixture as it is carried from left to right in the mixing chamber, as viewed in FIG. 3, will thoroughly develop the gluten in the dough. Thus the portion 66 of the agitator member having the core of variable thickness serves as the dough developing portion of the agitator.

In order to increase the dough developing action in the dough developing portion of the mixing chamber, as well as the mixing action in the pre-mixing portion thereof, longitudinally extending inwardly directed ribs 83 are provided at regular spaced intervals around the tubular wall 20, and openings 84 are provided in the spiral flange 73 to also increase the developing action of the agitator member in the dough developing portion of the apparatus. While said openings are preferably rectangular, they can be of other shapes and still be effective.

Instead of providing a fixed wall throughout the length of the tubular body 20 of the mixer, the movable wall portion 27 is provided for adjusting the developing action of the developer portion of the agitator in cooperation with the walls of the mixing chamber, as the less the space between the curved wall portion 27 and the dough developing portion of the agitator member, the greater the developing action will be. Thus the rate of deevlopment of the dough by the agitator member of the machine can be adjusted by adjusting the rate of rotation of the agitator member by adjustment of the variable speed drive 58 for the hollow shaft 48, or by adjusting the position of the arcuate wall 27 or both. Thus a very fine adjustment of the developing action of the machine can be obtained.

The rate at which the dough material passes through the mixer and discharges through te outlet connection 43 is determined by means of a screw conveying means provided at te right end of the machine comprising the spiral flange 85 provided on the sleeve 49 which is keyed to the shaft 47 to rotate therewith. The speed at which the contents of the mixer are moved through the mixing chamber is determined by means of this screw conveyor by adjustment of the speed of the shaft 47 by adjustment of the variable speed drive 50.

What I claim is:

1. A continuous dough mixer having a tubular wall providing a mixing chamber, an inlet connection adjacent one end of said chamber, an outlet connection at the other end of said chamber and continuously rotatable means in said chamber for advancing dough material in said chamber toward said outlet connection comprising dough developing means having means thereon cooperating with said tubular wall to reduce the space between said dough developing means and said tubular wall and pre-mixing means on said rotatable means comprising conveying means spaced from said dough developing means and ing pre-mixed dough to said dough developing means and agitating means on said conveying means.

2. The continuous dough mixer claimed in claim 1 in which said rotatable means has a core, a continuous spiral flange on said core, and said means cooperating with said tubular wall comprises protuberances on said core between the turns of said flange projecting toward said tubular wall.

3. The continuous dough mixer claimed in claim 1 in which means is provided between said developing means and said outlet connection for continuously withdrawing developed dough from said developing means at a uniform rate and discharging said dough into said outlet connection.

4. The continuous dough mixer claimed in claim 1 in which said tubular wall has inwardly directed longitudinally extending ribs thereon extending continuously along said wall cooperating with said developing means.

5. The continuous dough mixer claimed in claim 1 in which said tubular wall has inwardly directed longitudinally extending ribs thereon, said ribs being spaced around said wall and extending continuously along said wall opposite said rotatable means.

6. A continuous dough mixer having a tubular wall providing a mixing chamber, an inlet connection adjacent one end of said chamber, an outlet connection at the other end of said chamber and rotatable means in said chamber for advancing dough material in said chamber toward said outlet connection comprising dough developing means having means thereon cooperating with said tubular wall to reduce the space between said dough developing means and said tubular wall, said rotatable means comprising a core having a spiral flange thereon and said means cooperating with said tubular wall to reduce the space between the dough developing means and wall comprising helically spaced thickened portions on said core between the turns of said flange.

7. A continuous dough mixer having a tubular wall providing a mixing chamber, an inlet connection adjacent one end of said chamber, an outlet connection at the other end of said chamber and rotatable means in said chamber for advancing dough material in said chamber toward said outlet connection comprising dough developing means having means thereon cooperating with said tubular wall to reduce the space between said dough developing means and said tubular wall, and said wall having a portion mounted for movement toward and away from said rotatable means.

8. The continuous dough mixer claimed in claim 6 in which said flange has spaced openings therein.

9. A continuous dough mixer having a tubular wall providing a mixing chamber, an inlet connection adjacent one end of said chamber, an outlet connection at the other end of said chamber and rotatable means in said chamber cooperating with said tubular wall to develop dough in said chamber, said tubular wall having an arcuate portion mounted for movement toward and away from said rotatable means and means for moving said arcuate portion toward and away from said rotatable means.

10. A continuous dough mixer having a tubular wall providing an elongated chamber, an inlet connection adjacent one end of said chamber, an outlet connection at the other end of said chamber and rotatable means in said chamber having conveying means thereon and agitating means on said rotatable means providing a pre-mixing zone in said chamber adjacent said inlet connection and means for alternately expanding and compressing said dough spaced from both said inlet and outlet connection, and said agitating means to provide a dough developing zone, means for rotating said rotatable means, rotatable continuous screw conveying means adjacent said outlet connection and means for rotating said last mentioned conveying means independently of said first mentioned rotatable means.

11. A continuous dough mixer having a tubular wall providing an elongated chamber, an inlet connection adjacent one end of said chamber, an outlet connection at the other end of said chamber and rotatable means in said chamber having conveying means thereon and means on said rotatable means providing a pre-mixing zone in said chamber adjacent said inlet connection and a dough developing zone spaced from both said inlet and outlet connection, means for rotating said rotatable means, rotatable conveying means adjacent said outlet connection, means for rotating said last mentioned conveying means independently of said first mentioned rotatable means, said tubular wall having an arcuate portion mounted for movement toward and away from said rotatable means and mens for moving said arcute portion toward and away from said rotatable means.

12. The continuous dough mixer claimed in claim 10 in which the means providing said developing zone has means cooperating with said tubular wall to provide a plurality of reduced spaces between said tubular wall and said dough developing means at spaced points along said mixing chamber.

13. The continuous dough mixer claimed in claim 10 in which the means providing said developing zone comprises a core on said rotatable means and protuberances on said core projecting toward said tubular wall.

14. The continuous dough mixer claimed in claim 10 in which the means providing said developing zone comprises a core on said rotatable means and protuberances on said core projecting toward said tubular wall at points spaced both longitudinally and circumferentially of said core.

15. A continuous dough mixer having a tubular wall providing an elongated chamber, an inlet connection adjacent one end of said chamber, an outlet connection at the other end of said chamber and rotatable means in said chamber having conveying means thereon and means on said rotatable means providing a pre-mixing zone in said chamber adjacent said inlet connection and a dough developing zone spaced from both said inlet and outlet connection. means for rotating said rotatable means, rotatable conveying means adjacent said outlet connection, means for rotating said last mentioned conveying means independently of said first mentioned rotatable means, the means providing said developing zone comprising a core on said rotatable means, a spiral flange on said core and helically spaced thickened portions on said core between the turns of said flange projecting toward said wall.

16. The continuous dough mixer claimed in claim 15 in which said tubular wall has an arcuate portion mounted for movement toward and away from said rotatable means and means for moving said arcuate portion toward and away from said rotatable means.

17. The continuous dough mixer claimed in claim 16 in which said tubular wall has inwardly directed longitudinally extending ribs thereon, said ribs being spaced around said wall.

18. In the method of making a yeast leavened dough, continuously introducing the dough ingredients into a pre-mixing zone, continuously mixing said ingredients in said zone to make a homogeneous mixture thereof while advancing said mixture through said zone and into an elongated dough developing zone open freely to said pre-mixing zone at one end thereof, developing said mixture in said developing zone by advancing said mixture through said developing zone toward the other end thereof while agitating the same and repeatedly forcing said mixture through restricted passages in said zone, and forcibly withdrawing said developed dough continuously from said other end of said developing zone at a variable rate to vary the rate of advance of said mixture through said developing zone.

References Cited

UNITED STATES PATENTS

| | | | |
|---|---|---|---|
| 2,560,147 | 7/1951 | Anderson | 100—117 X |
| 2,731,247 | 1/1956 | Hudry | 259—6 |
| 2,896,556 | 7/1959 | Sippel et al. | 107—30 |
| 2,953,460 | 9/1960 | Baker | 107—54(2) X |
| 3,189,324 | 6/1965 | Gubler | 259—109 X |
| 3,452,965 | 7/1969 | Leister | 259—6 |

WALTER A. SCHEEL, Primary Examiner

A. O. HENDERSON, Assistant Examiner

U.S. Cl. X.R.

107—54 D

UNITED STATES PATENT OFFICE
CERTIFICATE OF CORRECTION

Patent No. 3,621,796           Dated November 23, 1971

Inventor(s) George P. Sternberg

It is certified that error appears in the above-identified patent and that said Letters Patent are hereby corrected as shown below:

Column 5 line 32 "te" should read --the--; line 34 "te" should read --the--; line 52 "and" should read --for--; line 53 "ing" should read --feeding--.

Column 6 line 66 "mens" should read --means-- and "arcute" should read --arcuate--.

Signed and sealed this 9th day of May 1972.

(SEAL)
Attest:

EDWARD M. FLETCHER, JR.          ROBERT GOTTSCHALK
Attesting Officer               Commissioner of Patents